Figure 1:
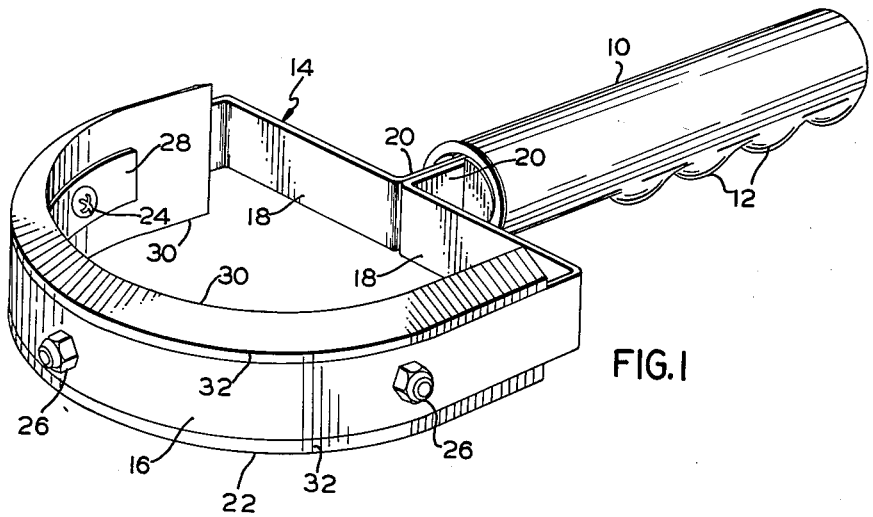

June 4, 1963

F. CZAPAR, JR 3,091,791

MEAT SCRAPER

Filed May 28, 1962

2 Sheets-Sheet 1

INVENTOR.
FRANK CZAPAR, JR.

BY

*Knox & Knox*

June 4, 1963　　　　F. CZAPAR, JR　　　　3,091,791
MEAT SCRAPER

Filed May 28, 1962　　　　　　　　　　　　　　　2 Sheets—Sheet 2

INVENTOR.
FRANK CZAPAR, JR
BY
Knox & Knox

United States Patent Office 3,091,791
Patented June 4, 1963

3,091,791
MEAT SCRAPER
Frank Czapar, Jr., 4217 Swift Ave., San Diego, Calif.
Filed May 28, 1962, Ser. No. 198,075
5 Claims. (Cl. 15—245)

The present invention relates generally to food handling implements and more particularly to a meat scraper.

When cutting meat by the prevailing method using a power saw, a film of fat and bone dust is left on the meat which is unsightly, undesirable and cause premature spoilage of the meat by deterioration. Present methods of removing the residue include wiping with dampened cloths or towels and scraping with various tools. The dampened cloths do not always pick up all the residue and leave water on the meat which causes a certain amount of bleaching. In addition, a damp cloth tends to soak up some of the meat juices which is undesirable. Metal scrapers commonly used often tear the surface of the meat, press bone particles into the meat, do not clean out the crevices or depressions around a bone and often actually scrape off more particles from the bone.

The primary object of this invention therefore, is to provide a meat scraper having a resilient connection to its handle, which facilitates control of scraping pressure while ensuring constant contact with the meat in following irregularities; more specifically, to provide a unique torsion bar support for the blade, said torsion bar being incorporated, at no extra cost, into the frame which carries the scraping blade, and it is also inherent in this principal object to provide for a thus accurately predetermined degree of resiliency in the blade mounting, this degree of resiliency being constant throughout the life of the tool.

Another object of this invention is to provide a meat scraper which will thoroughly clean meat of fat and bone particles without removing natural juices and without damaging the surface of the meat.

Another object of this invention is to provide a meat scraper having a resilient scraping blade which will conform to irregularities of bone and meat and clean out crevices.

A further object of this invention, quite important from a practical viewpoint, is to provide a meat scraper having a reversible and easily replaceable scraping blade.

Finally, it is an object to provide a meat scraper of the aforementioned character which is simple and convenient to manufacture and use and which will give generally efficient and durable service.

Figure 2:
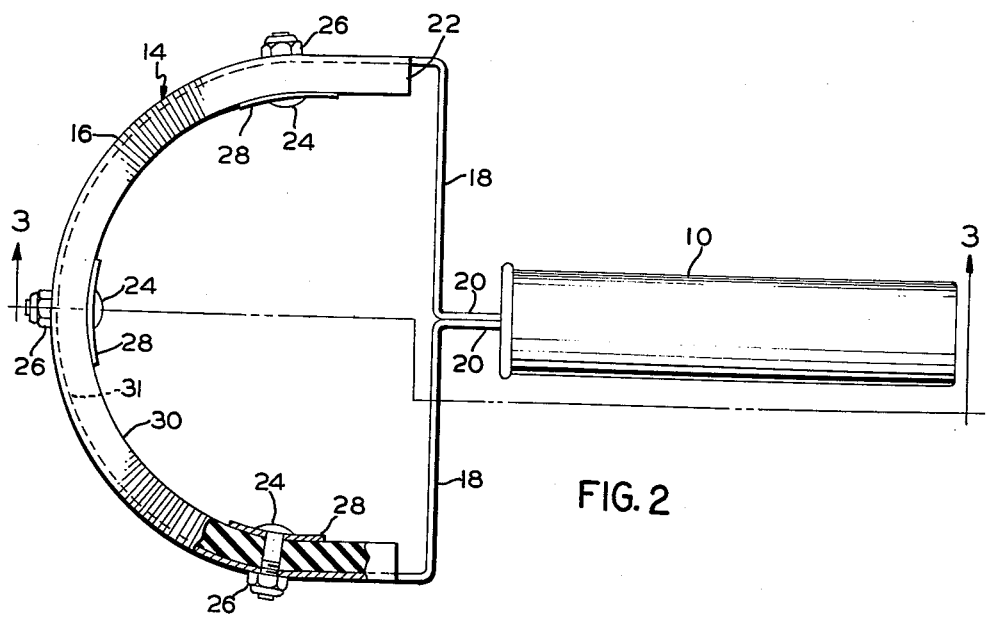
Figure 3:
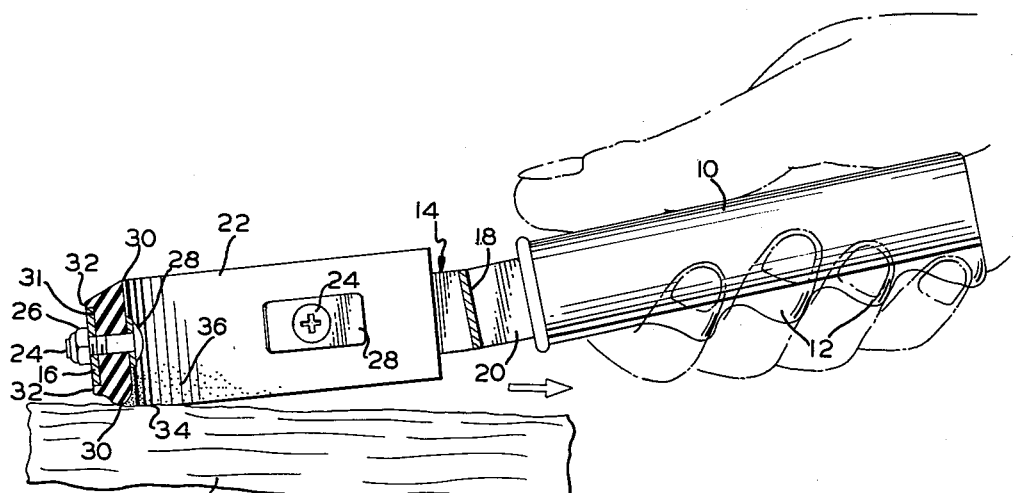
Figure 4:
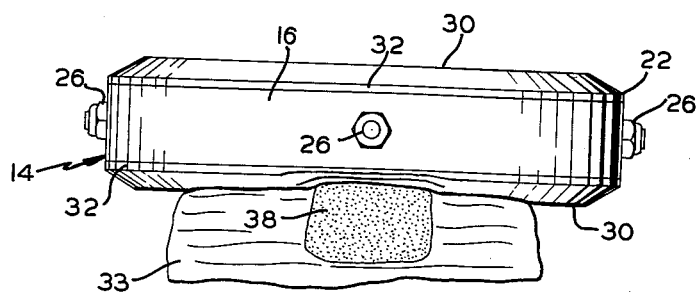

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a perspective view of the meat scraper;
FIGURE 2 is a top plan view thereof;
FIGURE 3 is a sectional view as taken on line 3—3 of FIGURE 2, but showing the scraper in use; and
FIGURE 4 is a front elevation view of the scraper illustrating the blade deformation around a bone.

The meat scraper has a handle 10, which may be provided with formed finger grip portions 12 for comfort and holding efficiency, and extending from the handle is a yoke 14 of flat metal strap material. The yoke 14 has a substantially U-shaped or semi-circular frame 16, the rear ends of which have opposed, inwardly extending torsion bar portions 18 meeting at the center and having rearwardly turned tongues 20, which are brought together to constitute a shank and fixed into handle 10 in any suitable manner.

Mounted inside the frame 16 is a blade 22 of substantially soft, flexible and resilient material such as natural rubber, synthetic rubber, plastic, or other suitable material. The blade 22 is bent to conform to the inside contour of frame 16 and is held in place by screws 24 and lock nuts 26, the screw heads seating on pressure-distributing retaining plates 28 which hold the blade 22 pressed against the inside of the frame 16. The upper and lower edges of blade 22 are bevelled to provide reasonably sharp scraping edges 30 around the inside thereof, the blade being of considerable thickness. The blade 22 is substantially wider than frame 16, so that the scraping edges 30 are well clear and unsupported by the frame for the required flexibility, said blade having a longitudinal channel 31 in which said frame is seated and the channel having outer lip portions 32 which overlap and rest on the edges of the frame, as in FIGURE 3. Thus the blade is supported firmly to maintain its shape for proper scraping, while allowing the edges sufficient freedom of flexibility to conform to irregularities in the meat and bones. With the lip portions 32 engaging the edges of frame 16, the blade 22 will not become distorted or displaced from the frame, even under considerable pressure, the normal direction of scraping stroke tending to pull the blade against the frame and hold said lip portions in place. In the preferred form, the projection of the blade 22 beyond each edge of frame 16 is very slightly more than the thickness of the blade and the bevel of the scraping edges 30 is inclined at about 60 degrees to the faces of the blade. However, the specific proportions are dependent to some extent on the materials used.

In use the tool is held in one hand, as illustrated in FIGURE 3, and pulled across the meat, indicated at 33 with sufficient downward pressure to deform the lower scraping edge 30 against the meat, the upper limit of this pressure being very simply but surprisingly accurately controlled, in normal use, by careful predetermination of the dimensioning and resiliency of the torsion bar 18. Bone dust and other residue, indicated at 34, are scraped from the meat and pile up in front of blade 22, the accumulation being cleaned off at the end of a stroke, or after several strokes depending on the amount collected. Since soft rubber, or comparable material from which blade 22 is made, are usually somewhat porous, or at least not completely smooth surfaced, particles of the fat and bone dust residue tend to cling to the surface, as at 36, rather than falling back upon the meat. Thus the cleaning action is greatly improved over that of a metallic or similar hard scraper.

As illustrated in FIGURE 2, the handle 10 can be pressed down with sufficient force to twist the torsion bar portions 18. This allows considerable pressure to be applied, yet the resilient torsion bar action allows the scraper to follow irregularities in meat and bone without snagging and without particular effort on the part of the user to follow the surface.

When scraping over a bone, residue along the sides of the bone is often missed because the scraper cannot fit closely down over the edges of the bone when the meat adjacent thereto is depressed by scraping pressure. The soft, easily deformable scraping edge 30, however, fits closely over or straddles the bone, indicated at 38 in FIGURE 4, depresses the meat and picks up the residue immediately adjacent the bone on both sides.

The meat is not bruised, torn or otherwise damaged by the scraper and the natural juices at the surface are generally retained. Either edge of blade 22 can be used, or if only one edge is normally used, the blade can be reversed to renew the scraping edge when one becomes worn, the blade also being easily replaceable by removing screws 24. The frame 16 need not be specifically U-shaped, but it has been found that this shape is particularly efficient, and the torsion bar is, as illustrated, easily incorporated into such a frame, with the arms of the U and with a shank connection with the handle.

It is understood that minor variation from the form of the invention disclosed herein may be made without departure from the spirit and scope of the invention, and that the specification and drawings are to be considered as merely illustrative rather than limiting.

I claim:

1. A meat scraper, comprising:
   a handle;
   a yoke of flat strip material fixed to said handle;
   said yoke having a substantially U-shaped frame;
   the portions of said yoke from said frame to said handle constituting torsion bars;
   a scraper blade of soft, resilient material secured within said frame;
   said blade having at least one scraper edge projecting beyond the edge of said frame and being coextensive therewith.

2. A meat scraper, comprising:
   a handle;
   a yoke of flat strip material fixed to said handle;
   said yoke having a substantially U-shaped frame;
   the portions of said yoke from said frame to said handle constituting torsion bars;
   an elongated scraper blade of thick, soft, resilient material secured within and conforming to said frame;
   said blade having bevelled scraper edges projecting beyond opposite edges of said frame and being coextensive therewith.

3. A meat scraper according to claim 2, wherein said blade is reversible and easily replaceable.

4. A meat scraper, comprising: a handle; a frame of flat strip material fixed to said handle; a scraper blade of soft resilient material secured on said frame and having a channel in which the frame is seated, the edges of said channel having lip portions engaging the adjacent edges of said frame; said blade having bevelled scraper edges projecting beyond opposite edges of said frame, wherein said frame includes a U-shaped portion and said scraper blade is secured on the inner side of said U-shaped portion.

5. A meat scraper, comprising:
   a handle;
   a yoke of flat strip material fixed to said handle;
   said yoke having a substantially U-shaped frame;
   the portions of said yoke from said frame to said handle constituting torsion bars;
   an elongated scraper blade of soft, resilient material secured within and conforming to said frame;
   said blade having a longitudinal channel in which said frame is seated, and the edges of said channel having lip portions engaging the edges of said frame;
   said blade having bevelled scraper edges projecting beyond opposite edges of said frame and being coextensive therewith.

References Cited in the file of this patent

UNITED STATES PATENTS

| | | |
|---|---|---|
| 1,351,862 | Menkhaus | Sept. 7, 1920 |
| 2,489,483 | Czapar | Nov. 29, 1949 |